United States Patent [19]

Bratten

[11] 4,407,720

[45] Oct. 4, 1983

[54] METHOD AND APPARATUS FOR FILTRATION OF CONTAMINATED LIQUIDS

[76] Inventor: Jack R. Bratten, 5970 St. James Dr., West Bloomfield, Mich. 48033

[21] Appl. No.: 366,817

[22] Filed: Apr. 8, 1982

[51] Int. Cl.³ .................... B01D 37/02; B01D 33/06
[52] U.S. Cl. ............................ 210/777; 210/784; 210/791; 210/798; 210/193; 210/217; 210/391; 210/404
[58] Field of Search ............... 210/791, 798, 784, 777, 210/778, 193, 217, 391, 393, 394, 398, 402, 404, 167

[56] References Cited

U.S. PATENT DOCUMENTS

| | | | |
|---|---|---|---|
| 2,152,167 | 3/1939 | Ahlmann | 210/193 |
| 2,395,499 | 2/1946 | Oliver | 210/393 |
| 2,567,266 | 9/1951 | Young | 210/404 |
| 2,679,936 | 6/1954 | Bench | 210/193 |
| 3,244,281 | 4/1966 | Kurz | 210/391 |
| 3,346,118 | 10/1967 | Rosaen | 210/391 |
| 3,794,178 | 2/1974 | Luthi | 210/404 |
| 3,814,259 | 6/1974 | Kamimura | 210/391 |
| 4,168,234 | 9/1979 | Hutto | 210/193 |
| 4,186,092 | 1/1980 | Stielau | 210/798 |
| 4,226,716 | 10/1980 | White | 210/193 |

FOREIGN PATENT DOCUMENTS 1006396 4/1957 Fed. Rep. of Germany ...... 210/393
600699 4/1948 United Kingdom ............... 210/217

*Primary Examiner*—Ernest G. Therkorn
*Attorney, Agent, or Firm*—Cullen, Sloman, Cantor, Grauer, Scott & Rutherford

[57] ABSTRACT

A fully submerged rotatable drum type of filter has a perforate cylindrical surface through which contaminated liquid is pulled by a suction pump. The inner periphery of the drum is sub-divided into numerous narrow, shallow, elongated chambers open at one end for communication with a main chamber which conveys filtered liquid to a port in the non-rotatable tube upon which the drum is rotatably mounted. A backwashing system for cleaning the perforate surface of the drum comprises a non-rotating channel which establishes sliding and sealing contact with a limited number of the open ends of the peripheral chambers to cause pressurized filtered backwashing liquid to flow into such peripheral chambers to remove filter cake from the perforate surface by the reverse flow therethrough. Filtration can therefore proceed through a majority of the peripheral chambers simultaneously with the backwashing operation through the limited number of peripheral chambers in communication with the backwashing system. A filter aid precoating system can optionally be used to apply a precoat to the perforate surface of the drum at a point on its circumference immediately after the backwashing station.

4 Claims, 4 Drawing Figures

METHOD AND APPARATUS FOR FILTRATION OF CONTAMINATED LIQUIDS

BACKGROUND AND SUMMARY OF THE INVENTION

Drum type filtration systems have been conventionally used in the past in applications requiring low flow rates per unit area and large filtration areas. For example, in the filtration of relatively high viscosity liquids such as oil used as coolants or lubricants for steel grinding operations, the separation of metallic or other types of particles from the oil requires relatively low flow rates per unit area of filtration surface. Economy of space therefore makes it desirable to utilize the relatively high filtration surface area per unit of floor area inherent in drum type filters.

The perforate surface of these conventionally used drums may be in the form of wedge wire, or screening or perforated plates with or without a supplementary expendable filter media sock. Additionally, it is conventional to employ a filter aid in powder or fiber form to precoat the filter surface with a low porosity medium for very fine filtration.

The disadvantage of these conventional systems is the need for periodic shut-down of the filtration operation for cleaning or replacement of the filter medium or surface. In order to maintain continuity of the machining operations, which require a continuous supply of filtered coolant or lubricant, it becomes necessary to maintain a large clean tank of filtered liquid as a substitute source during the period of interruption when the filter is shut down. The clean tank necessitates the consumption of additional floor space and the use of additional valving and controls to route the filtered liquid to and from such tank.

Another disadvantage of many existing drum type filter systems is the limitation on the portion of the filter surface which is functionally submerged in the contaminated liquid, because of the need to have a portion of the surface exposed to the air to dry the filter cake so that it can be readily removed.

Accordingly, it is the principal object of the present invention to provide an improved filtration system of the drum type which permits cleaning of the drum by backwashing action without the need for interrupting the filtering process and without the need for maintaining a large capacity clean tank.

These objectives have been accomplished by segmenting the interior of the drum into a plurality of small-volume individual chambers along the interior face of the perforate drum surface. A suction pump draws contaminated liquid through the perforate surface and these peripheral chambers into a main filtered liquid collecting chamber and from there through parts in the stationary central tube upon which the drum is rotatably mounted. Cleaning of the drum is accomplished by a backwashing system which supplies pressurized filtered liquid to a stationary port which is in sliding contact with the open ends of a limited number of the small peripheral chambers, whereby backwashing can proceed through these few chambers simultaneously with continuous filtration through the remaining majority of the chambers. Because filtration proceeds uninterrupted, and because only a small portion of the drum is being backwashed at any given time, only a small volume of clean liquid need be maintained for backwashing. In some cases, it may be possible to eliminate a clean liquid reservoir by simply diverting a small portion of the filtrate from the output of the apparatus directly to the backwashing system.

Backwashing can be continuous, or it can be intermittent under the influence of a pressure sensor which responds to a build-up of excessive pressure drop in the filtrate output line resulting from the excessive accumulation of filter cake to initiate backwashing and indexing of the drum. The disclosed drum type filter system can be used in groups within a tank of dirty liquid, so that, if necessary, one drum can be removed for maintenance while the others continue to operate. Similarly, such tank can also contain supplementary filtering or debris removing devices such as vacuum boxes on the bottom of the tank, drag out chains and the like. A supplementary vacuum box is desirable because it maintains a downward flow in the tank so that filter cake or other debris loosened from the drum surfaces by the backwashing action will not float and re-coat the drum surface.

The novel segmented drum of the present invention also lends itself to use of an optional pre-coating feature by which a filter aid can be applied to the newly cleaned portion of the drum surface after it is indexed away from the backwashing area.

These and other features and advantages of the present invention will become more readily apparent from the following detailed description.

DETAILED DESCRIPTION OF THE DISCLOSURE

Figure 1:
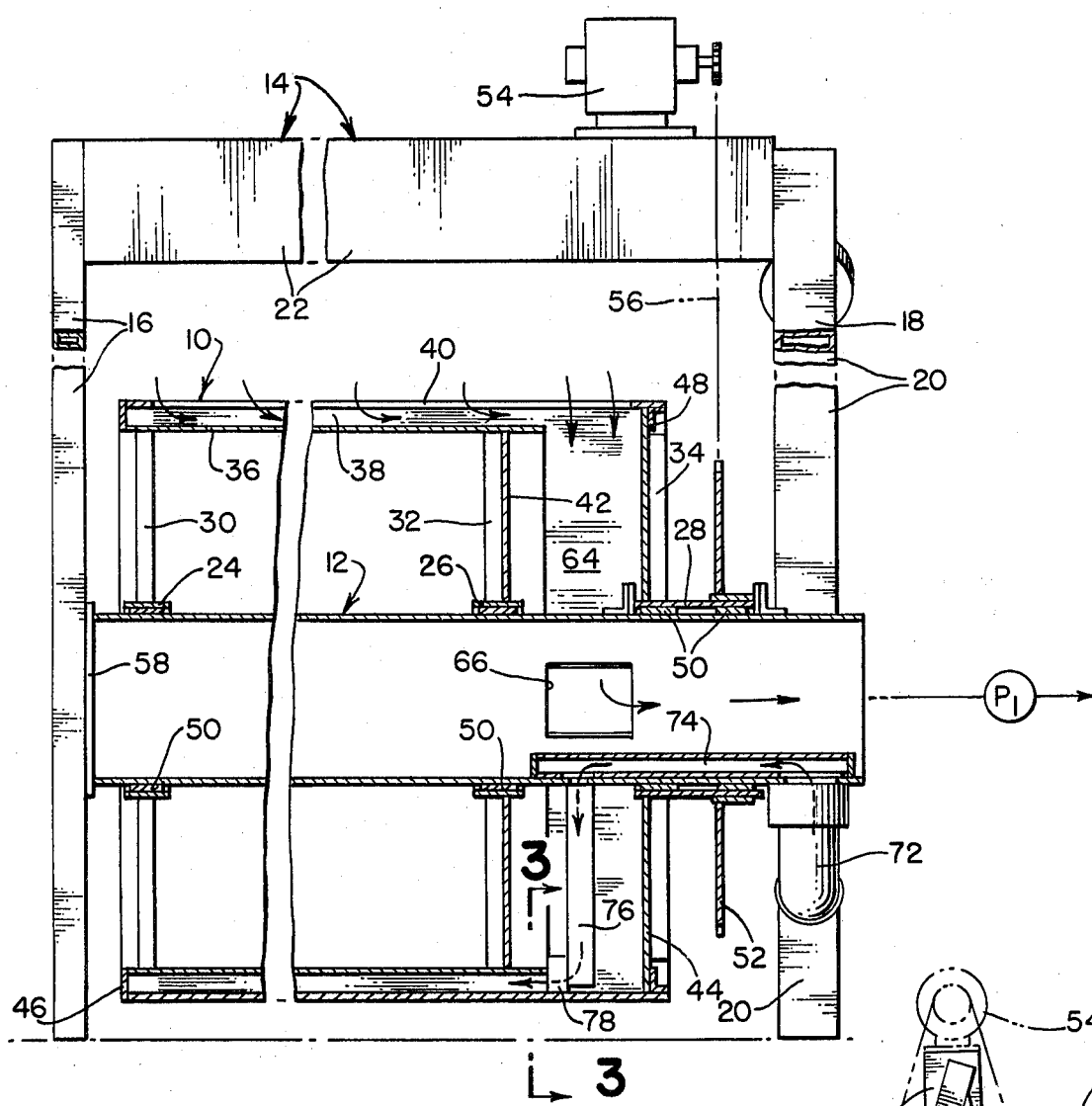
FIG. 1 is a simplified side elevational view, partly fragmented and in section, of the improved drum type filtration system of the present invention.
Figure 2:
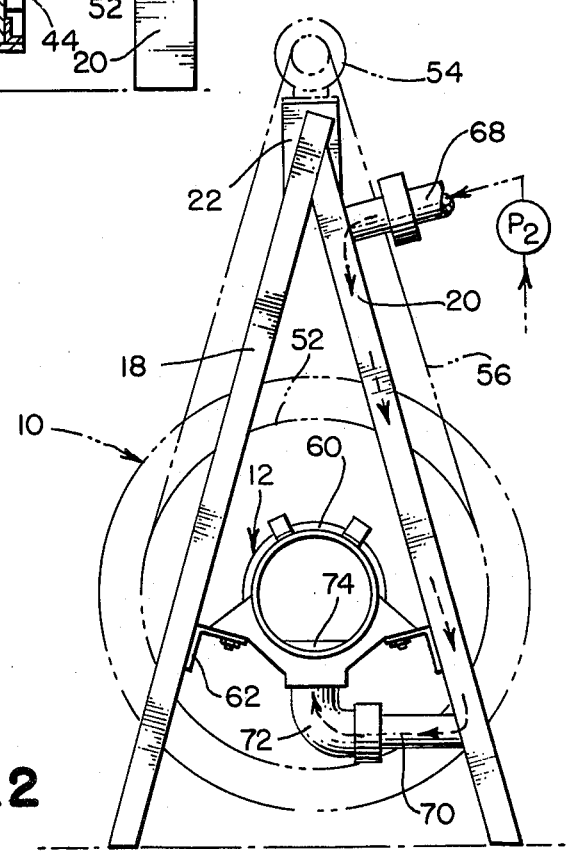
FIG. 2 is an end view of the apparatus of FIG. 1.

Referring to FIGS. 1 and 2 of the drawings, the filtration system generally comprises a cylindrical filter drum 10 which is rotatably mounted on a stationary tube 12 supported by three-legged frame 14. The supporting frame comprises a single verticle leg 16 at the left end, a pair of upwardly converging legs 18, 20 at the right end and a connecting upper beam 22.

Drum 10 includes three axially spaced sections of mechanical tubing 24, 26 and 28 which are connected through respective series of angularly spaced spoke-like bars 30, 32 and 34 to the periphery of the drum. The drum periphery comprises an imperforate sheet metal inner cylinder 36 which extends for a substantial portion of the axial length of drum 10, and has secured to its outer surface a plurality of closely-spaced, parallel, longitudinally extending bars 38, the outer edges of which are secured to the perforate surface 40 of the drum (see also FIG. 3). In the preferred embodiment, perforate surface 40 is in the form of a wedge wire tube, it being understood that such perforate surface could also be fabricated from perforate plate or wire mesh, any one of which could optionally further include a filter media sock, depending upon the filtration application, as will be understood by those skilled in the art.

In addition to radial bars 30, 32 and 34, a pair of imperforate plates 42 and 44 interconnect tubing sections 26, 28, respectively, with inner cylinder 36 and wedge wire tube 40, respectively. Annular imperforate end cap 46 seals the left end of the peripheral chambers defined by cylinders 36 and 40 and longitudinal bars 38. Angle brackets 48 provide an interconnection between end plate 44 and wedge wire tube 40. The main portion of the volume of drum 10 is open and non-functional, and it is contemplated that the open left hand end (as viewed in FIG. 1) of the drum may have a screen to keep debris from accumulating therein.

As previously stated, drum 10 is rotatably mounted on stationary tube 12 through a series of interposed journal-type bearings 50. One type of bearing which has been successfully employed is an extruded wear strip formed of "Hi-D" heavy polymer, manufactured by Arguto, Inc. of Aston, Pa. These may be used with seals, such as O-rings, if necessary to establish an effective seal at the bearings located on each side of chamber 64. The drum is rotated by a chain drive which includes the sprocket 52, air motor 54 and chain 56. The left end of tube 12 is closed off by end plate 58 which is bolted to leg 16, while the right end of the tube is secured to legs 18 and 20 by means of U-bolt 60 and brackets 62.

Previously described plates 42 and 44 (see FIG. 1) define a main annular filtered liquid chamber 64 which communicates with the open right hand ends of the individual peripheral chambers defined by longitudinal bars 38. The flow path for the filtrate continues from chamber 64 through ports or openings 66 in the wall of tube 12 and from there out through the open right end of tube 12 to suction pump $P_1$. Preferably, three such ports 66 are spaced angularly about the periphery of tube 12.

Figure 3:
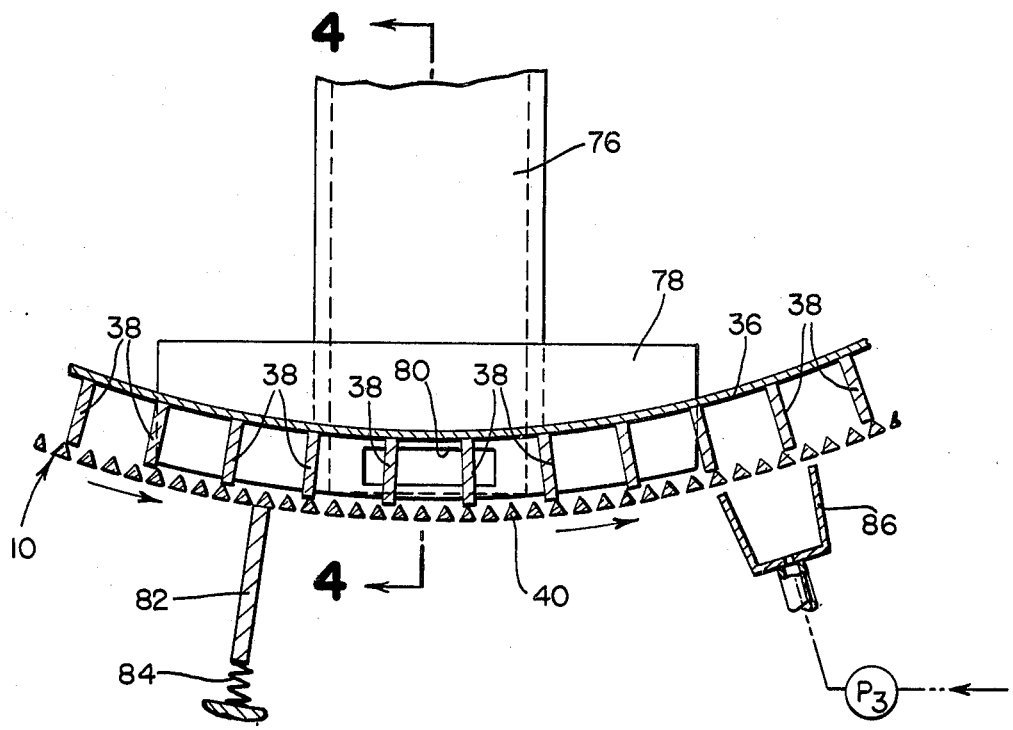
FIG. 3 is an enlarged fragmentary cross-sectional view in the direction of arrows 3—3 of FIG. 1.
Figure 4:
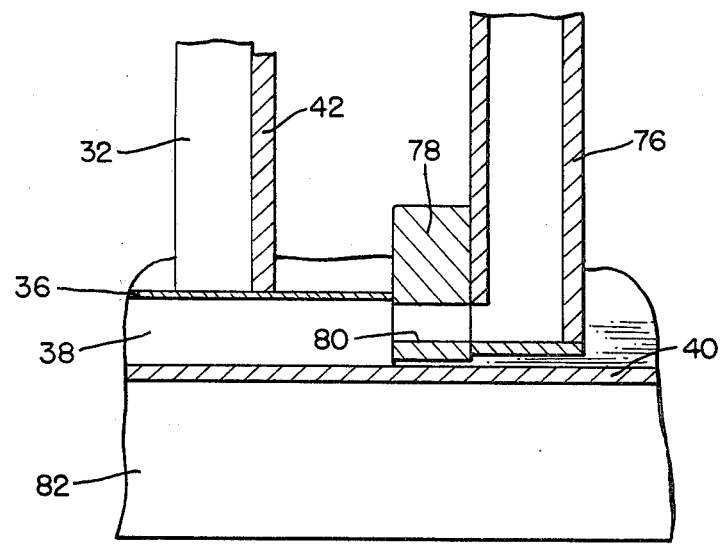
FIG. 4 is a fragmentary cross-sectional view in the direction of arrows 4—4 of FIG. 3.

The backwashing system may optionally include pump $P_2$ (see FIG. 2) which conveys clean filtrate to pipe 68 and then down through hollow leg 20, pipe 70 and elbow 72 to an inlet in stationary tube 12, from which the filtrate flows through longitudinal channel 74 to a second port in the tube wall. As best shown in FIGS. 1, 3 and 4, the second port communicates with a radially extending rectangular tube 76 which terminates at its outer end with a sliding seal 78 provided with a pot 80. Seal 78, being stationary, provides sliding contact with the open right hand ends of the peripheral chambers of the drum, and therefore is preferably formed of a material such as the above mentioned "Hi-D" heavy polymer bearing material. As will be understood by those skilled in the art, proper alignment and sealing contact between seal 78 and the ends of the segmented drum chambers can be assured by appropriate resilient type flange connections (unillustrated) interposed in radial tube 76 between seal 78 and tube 12 to bias the radially outer end of tube 76 and seal 78 into engagement with the ends of the peripheral chambers. As best seen in FIGS. 3 and 4, port 80 in seal 78 is relatively small, preferably covering only one or two of the peripheral chambers.

A spring loaded scraper bar 82 is provided to assist in removing filter cake from the drum, the spring being schematically shown at 84 to bias the scraper bar into sliding contact with the periphery of drum 10 and located so that the periphery of the rotating or indexing drum will contact the scraper immediately prior to the point at which the backwashing liquid is applied to blow off any residue of the filter cake. As will be observed in FIG. 3, sliding seal 78 extends circumferentially to seal off the ends of several peripheral chambers in the area contacted by scraper bar 82. In this way, such sealed chambers are isolated from the suction of pump $P_1$, so that filter cake or other debris can be more readily scraped off the drum periphery and, once removed, will not immediately be drawn back into contact with the drum.

Another optional feature of the present invention, illustrated in FIG. 3 is the provision of means for applying a powdered or fibrous type of filter aid as a pre-coat to the perforated surface of drum 10. Such application system can be in the form of a longitudinally extending channel-shaped trough 86 which is supplied with a slurry of clean liquid and pre-coat material from pump $P_3$. The trough is positioned to apply the material under pressure to a portion of the drum periphery which has just left the backwash area and is therefore clean and not yet coated with any filter cake. The pressure from pump $P_3$, in conjunction with the suction tending to draw liquid into the interior of the drum, functions to guide the pre-coat slurry onto the drum surface to establish the precoating.

As explained above, the drum-type filter of the present invention can be utilized in a fully submerged condition in a tank of contaminated liquid. One convenient way to install the illustrated apparatus in the tank is to dimension the axial length of the assembly to be just less than the interior width of the tank, and to provide vertical guide rails for the apparatus on the inside of the tank walls so that it can be lowered by an overhead crane or fork-lift and guided by the guide rails as it drops into position in the tank. As it approaches its resting point, a system of wedges or cams can be employed to force the right-hand open end of tube 12 into sealing contact with a resilient outlet seal in the tank wall from which filtered liquid is withdrawn under the influence of suction pump $P_1$. Those skilled in the art will also recognize that it would be desirable to utilize a sheet metal housing around chain drive 56 to prevent rags or other debris which may be in the contaminated liquid or tank from jamming the drum rotating or indexing means.

Those skilled in the art will understand that the drum can be operated in a continuous slow rotation mode, with filtration and backwashing both proceeding simultaneously and continuously. Alternatively, it is contemplated that a preferred mode of operation would comprise intermittent rotation of the drum only upon the sensing of an excessive pressure drop in the filtrate outlet line as a result of excessive build-up of filter cake, which pressure drop can trigger indexing of the drum and commencement of the backwashing cycle. The indexing and backwashing operations would continue until the pressure sensing device senses a reduced pressure drop in the filtered liquid outlet line.

As further alternative modes of operation, the backwashing flow may run continuously, though drum indexing occurs only intermittently as explained above, and the flow of the liquid portion of the precoat may also be continuous, with the powdered or fibrous additive being injected to form a slurry only during indexing of the drum. This latter mode is contemplated to aid in keeping sludge from building up in the precoat application area. It is also contemplated that the effectiveness of the backwashing action may be enhanced by rapid on and off cycling of the backwashing flow, because the shock or impact of the onset of such flow seems to have a greater tendency to loosen the filter cake than does mere sustained flow.

In addition to the above-mentioned advantages of the present system, the removal by scraping and backwash of only a portion of the accumulated filter cake at any one time preserves the additional fine filtration action of the accumulated filter cake which remains on the majority of the drum surface. At any time, only a very small fraction of the total filtration area is newly cleaned and free of any accumulated filter cake.

An exemplary embodiment of the drum filter apparatus described herein may have a diameter of about three feet, a drum length of about six feet, a spacing between segmenting bars of about one inch and a radial gap of about one inch between inner sleeve 36 and perforate outer surface 40. The drum indexing rate is about one revolution per minute.

The total volume of the peripheral chambers is selected to be small relative to the capacity of pump $P_1$, to assure sufficient flow velocity through such chambers to prevent accumulation of chips or other relatively large particles in such chambers which may pass through perforate surface 40. Similarly, such small volume aids in achieving the desired high flow velocity for the backwashing operation.

Because only a small number of the small volume peripheral chambers are being backwashed at any time, it is possible to completely eliminate the need for a clean tank to supply backwashing liquid. In such case, pump $P_2$ can also be eliminated, and a portion of the filtrate output from the system may be diverted (possibly under the influence of a solenoid-activated valve if backwashing is not to be continuous) to supply the input to backwash pipe 68.

This invention may be further developed within the scope of the following claims. Accordingly, the above specification is to be interpreted as illustrative of only a single operative embodiment of the present invention.

I now claim:

1. In a filtration system for separating solid particles from a liquid of the type characterized by a rotatable drum having a perforate cylindrical surface fully submerged in the contaminated liquid and provided with suction means connected to the interior of the drum to establish flow of contaminated liquid through the perforate surface and into the drum interior, the improved method of filtration which comprises:
    sub-dividing the interior of the drum into a plurality of radially shallow parallel adjacent peripheral chambers, each chamber defined on its radially outward boundary by a circumferentially narrow portion of the perforate drum periphery extending a substantial portion of the length of the drum, each of said chambers being otherwise sealed except for an outlet into a main filtered liquid chamber within the interior of the drum;
    establishing an inward flow of liquid through the perforate surface of the drum and into said peripheral chambers and then into said main filtered liquid chamber and then to an outlet from the drum;
    establishing a flow of pressurized filter liquid to backwashing liquid port means at a stationary location within the interior of the drum where, at any angular position of the drum, only a small fraction of the total number of peripheral chambers communicate with said port means to receive said pressurized backwashing liquid therefrom for causing accumulated filter cake to be removed from the perforate surface of the communicating chambers by the reverse flow of backwashing liquid therethrough;
    and rotating said drum to selectively bring successive peripheral chambers into communication with said backwashing liquid port means;
    whereby filtration proceeds through all of the chambers which are in communication with said main filtered liquid chamber simultaneously with backwashing through those chambers which are in communication with said backwashing liquid port means.

2. The method of claim 1 which further includes the step of applying a filter air pre-coat at a location on the drum adjacent to the backwashing liquid port means, whereby the pre-coat may be applied to a portion of the drum which has been cleaned by the backwashing step and prior to the build-up of any significant amount of filter cake thereon.

3. In a filtration system for separating solid particles from a liquid of the type characterized by a rotatable drum having a perforate cylindrical surface fully submerged in the contaminated liquid and provided with suction means connected to the interior of the drum to establish flow of contaminated liquid through the perforate surface and into the drum interior, the improved filtration apparatus which comprises:
    said drum being rotatably mounted on a stationary tube;
    said drum comprising a perforate outer cylindrical surface and a second coaxial imperforate cylindrical surface located radially inwardly from said outer surface a distance which is a small fraction of the total radius of the drum, said two cylindrical surfaces defining an annular zone which is subdivided into a series of longitudinally extending peripheral chambers by a series of long parallel imperforate partitions extending for at least a substantial portion of the length of the drum and joined along their length to said cylindrical surfaces;
    each of said peripheral chambers being defined by an angularly narrow sector of the perforate outer cylindrical surface and imperforate inner cylndrical surface and two adjacent partitions, all of said peripheral chambers being closed at a first axial end of the drum and being normally open at their opposite end;
    the radially inner side of said second cylindrical surface being exposed to contaminated liquid at substantially atmospheric pressure;
    said drum further comprising a main filtered liquid chamber normally communicating with said open ends of said peripheral chambers to receive filtered liquid therefrom;
    said stationary tube having filtrate liquid port means communicating with said main filtered liquid chamber to receive filtered liquid therefrom and convey it through the interior of said tube to an outlet under the influence of the suction means;
    a backwashing system comprising a pressurized flow of filtered liquid supplied to backwashing liquid port means at a stationary location adjacent said open ends of said peripheral chambers, said backwashing liquid port means establishing a sliding and sealing contact with a small angular sector of said normally open ends of said peripheral chambers, whereby said backwashing system selectively delivers pressurized backwashing liquid through said backwashing liquid port means to the limited number of peripheral chambers which are in communication therewith at any given position of said drum, to thereby cause accumulated filter cake to be removed from the perforate surface of the communicating chambers when a reverse flow of backwashing liquid is established therethrough;

the remaining ones of said peripheral chambers which are not in sealing contact or communication with said backwashing liquid port means being in communication with said main filtered liquid chamber whereby filtration proceeds through all of said remaining peripheral chambers simultaneously with backwashing through said limited number of peripheral chambers;

and drum rotating means for causing said drum to rotate to bring successive ones of said peripheral chambers into communication with said backwashing system to be cleaned thereby.

4. The filtration apparatus of claim 3 which further comprises filter aid pre-coat applying means for delivering a filter aid to the cleaned portion of the perforate surface of the drum which emerges from said backwashing liquid port means.

* * * * *